US010775960B2

(12) United States Patent
Madonna et al.

(10) Patent No.: US 10,775,960 B2
(45) Date of Patent: Sep. 15, 2020

(54) USER GENERATED VIRTUAL ROOM-BASED USER INTERFACE

(71) Applicant: Savant Systems, Inc., Hyannis, MA (US)

(72) Inventors: Robert P. Madonna, Osterville, MA (US); Michael C. Silva, East Sandwich, MA (US); Nicholas J. Cipollo, Boston, MA (US); Andrew R. Hamm, East Sandwich, MA (US)

(73) Assignee: Savant Systems, Inc., Hyannis, MA (US)

( * ) Notice: Subject to any disclaimer, the term of this patent is extended or adjusted under 35 U.S.C. 154(b) by 92 days.

(21) Appl. No.: 14/190,984

(22) Filed: Feb. 26, 2014

(65) Prior Publication Data

US 2014/0181704 A1 Jun. 26, 2014

Related U.S. Application Data

(63) Continuation-in-part of application No. 13/551,289, filed on Jul. 17, 2012, now Pat. No. 9,055,627, which
(Continued)

(51) Int. Cl.
*G06F 3/0481* (2013.01)
*G06F 3/0487* (2013.01)
(Continued)

(52) U.S. Cl.
CPC ........ *G06F 3/04817* (2013.01); *G06F 3/0487* (2013.01); *G06F 3/04842* (2013.01); *H05B 47/155* (2020.01); *H05B 47/175* (2020.01)

(58) Field of Classification Search
CPC ............... G06F 3/04817; G06F 3/0487; G06F 3/04842; H05B 47/175; H05B 47/155
(Continued)

(56) References Cited

U.S. PATENT DOCUMENTS 6,160,359 A 12/2000 Fleischmann
6,463,343 B1 * 10/2002 Emens ................. G05B 19/042
382/115
(Continued)

FOREIGN PATENT DOCUMENTS

CN 102034341 4/2011
DE 100 12 508 A1 9/2001
(Continued)

OTHER PUBLICATIONS

"HomeRunner: User Manual," JDS Technologies, Feb. 2007, pp. 1-12.
(Continued)

*Primary Examiner* — Tadesse Hailu
*Assistant Examiner* — Darrin Hope
(74) *Attorney, Agent, or Firm* — Cesari and McKenna, LLP; James A. Blanchette (57) ABSTRACT

In one embodiment, a technique is utilized to generate a virtual-room of a virtual room-based user interface that controls one or more devices within a physical room of a structure. A user is prompted to select one or more services provided by the one or more devices within the physical room. A plurality of images of the physical room are obtained that each share substantially a same perspective. The plurality of images include an all-off image, in which all of the one or more of the services are in an inactive state, and one or more service-specific images, in which a single service is in an active state and any other services are in the inactive state. The plurality of images are aligned to create an aligned image stack. One or more hit boxes are designated. The virtual room is generated based on the aligned image stack and the designated one or more hit boxes.

24 Claims, 10 Drawing Sheets

Related U.S. Application Data is a continuation of application No. 12/792,236, filed on Jun. 2, 2010, now Pat. No. 8,296,669.

(60) Provisional application No. 61/183,825, filed on Jun. 3, 2009.

(51) Int. Cl.
*G06F 3/0484* (2013.01)
*H05B 47/155* (2020.01)
*H05B 47/175* (2020.01)

(58) Field of Classification Search
USPC .......................................................... 715/762
See application file for complete search history.

(56) References Cited

U.S. PATENT DOCUMENTS

| | | | |
|---|---|---|---|
| 6,756,998 | B1 | 6/2004 | Bilger |
| 7,047,092 | B2 | 5/2006 | Wimsatt |
| 7,061,488 | B2 | 6/2006 | Randel |
| 7,167,777 | B2 | 1/2007 | Budike, Jr. |
| 7,529,838 | B2 | 5/2009 | Primm et al. |
| 7,760,107 | B1 | 7/2010 | Stepps et al. |
| RE42,289 | E | 4/2011 | Vincent |
| 8,042,049 | B2 | 10/2011 | Killian et al. |
| 8,122,131 | B2 | 2/2012 | Baum et al. |
| 8,352,079 | B2 * | 1/2013 | Wendt .................... A63F 13/02 315/312 |
| 2002/0067355 | A1 | 6/2002 | Randel |
| 2004/0160199 | A1 * | 8/2004 | Morgan ................. A01M 1/04 315/312 |
| 2004/0260427 | A1 | 12/2004 | Wimsatt |
| 2005/0097478 | A1 | 5/2005 | Killian et al. |
| 2006/0098112 | A1 * | 5/2006 | Kelly ................. H04N 5/23222 348/333.12 |
| 2007/0171091 | A1 | 7/2007 | Nisenboim et al. |
| 2007/0265121 | A1 | 11/2007 | Vaseli et al. |
| 2007/0268121 | A1 | 11/2007 | Vasefi et al. |
| 2007/0288849 | A1 | 12/2007 | Moorer et al. |
| 2008/0127063 | A1 | 5/2008 | Silva et al. |
| 2008/0200205 | A1 * | 8/2008 | Liu ....................... G06F 3/0346 455/556.1 |
| 2008/0265797 | A1 * | 10/2008 | Van Doorn .......... H05B 37/029 315/292 |
| 2008/0270937 | A1 | 10/2008 | Poulet et al. |
| 2009/0066534 | A1 * | 3/2009 | Sivakkolundhu ..... H04L 12/281 340/4.32 |
| 2009/0083634 | A1 | 3/2009 | Madonna et al. |
| 2009/0303197 | A1 | 12/2009 | Bonczek et al. |
| 2010/0157018 | A1 * | 6/2010 | Lampotang ............. G06F 3/011 348/36 |
| 2010/0164878 | A1 | 7/2010 | Bestle et al. |
| 2010/0185969 | A1 | 7/2010 | Wendt et al. |
| 2010/0211897 | A1 * | 8/2010 | Cohen .................... G06Q 50/22 715/764 |
| 2010/0277107 | A1 | 11/2010 | Baaijens et al. |
| 2011/0273114 | A1 | 11/2011 | Ogg et al. |
| 2012/0084472 | A1 | 4/2012 | Locascio et al. |
| 2012/0284672 | A1 | 11/2012 | Madonna et al. |
| 2016/0120009 | A1 | 4/2016 | Aliakseyeu et al. |

FOREIGN PATENT DOCUMENTS

| | | |
|---|---|---|
| DE | 103 14 134 A1 | 10/2003 |
| EP | 1 986 474 A2 | 10/2008 |
| JP | H07-073978 | 8/1993 |
| JP | 2002-245102 | 2/2001 |
| JP | 2012-529147 | 11/2012 |
| WO | WO-2002/099780 A2 | 12/2002 |
| WO | WO-2002-103841 A1 | 12/2002 |
| WO | WO-2009/004531 A1 | 1/2009 |
| WO | WO-2009-061014 A1 | 5/2009 |
| WO | WO-2010/141076 A1 | 12/2010 |
| WO | WO-2013/137191 | 9/2013 |

OTHER PUBLICATIONS

"Notification of Transmittal of the International Search Report and the Written Opinion of the International Searching Authority, or the Declaration," International Filing Date: Jun. 2, 2010, International Application No. PCT/US2010/001600, Applicant: Nsavan Systems, LLC. , dated Sep. 3, 2010, pp. 1-14.

"Pocket WebX: Installation and Operation Manual," JDS Technologies, Feb. 2004, pp. 1-12.

U.S. Appl. No. 13/551,289, filed Jul. 17, 2012 by Robert P. Madonna et al. for a Virtual Room-Based Light Fixture and Device Control, pp. 1-50.

"Notification of Transmittal of the International Search Report and the Written Opinion of the International Searching Authority, or the Declaration," International Filing Date: Feb. 12, 2015, International Application No. PCT/US2015/015628, Applicant: Savant Systems, LLC, dated Apr. 29, 2015, pp. 1-9.

"Notification of Transmittal of the International Search Report and the Written Opinion of the International Searching Authority, or the Declaration," International Filing Date: Sep. 6, 2018, International Application No. PCT/US2018/049712, Applicant: Savant Systems, LLC, dated Nov. 28, 2018, pp. 1-14.

* cited by examiner

USER GENERATED VIRTUAL ROOM-BASED USER INTERFACE

RELATED APPLICATIONS

The present application is a continuation-in-part of U.S. patent application Ser. No. 13/551,289, filed Jul. 17, 2012 by Robert P. Madonna et al., entitled "Virtual Room-Based Light Fixture and Device Control", which is itself a continuation of U.S. patent application Ser. No. 12/792,236, filed on Jun. 2, 2010 by Robert P. Madonna et al., and entitled "Virtual Room-Based Light Fixture and Device Control", which claims the benefit of U.S. Provisional Patent Application Ser. No. 61/183,825, filed Jun. 3, 2009 by Robert P. Madonna et al., entitled "Virtual Room-Based Light Fixture and Device Control", the contents of all of which are incorporated by reference herein in their entirety.

BACKGROUND

Technical Field

The present disclosure relates generally to device control and more specifically to generation of a user interface to control devices coupled to a home automation or electronic device control system.

Background Information

As homes and other structures become larger, and become filled with more devices, such as light fixtures, motor-actuated devices and electronic devices, the burden of controlling these devices increases. Traditionally, many devices have been controlled by mechanical switches. While mechanical switches are reliable and cost-effective, they have many limitations, especially when there are many devices located in the same room of a structure. For example, a large room may include a number of light fixtures, such as lamps, overhead fixtures, task lights, etc.; a number of motor-operated devices, such as automatic window shades, automatic doors, etc.; and a number of electronic devices, such as display screens (e.g., televisions and monitors), audio/video (a/v) devices, computer devices, etc. To control all these devices, a large number of mechanical switches may be needed. As the number of mechanical switches increases within the room, usability decreases. Mechanical switches often are unlabeled, or if labeled, marked with only cryptic descriptions (e.g., "Lamp 1", "Lamp 2", "Window Shade 1", etc.). A user may be forced to memorize which of the many mechanical switches available in the room controls which device. A new guest in the room, who has not memorize this relationship, typically must rely upon trial and error to determine which mechanical switch controls which device, flipping switches until they happen upon the result they desire.

A variety of types of home automation and electronic device control systems have been developed that attempt to improve upon the shortcomings of mechanical switches. Such systems typically include one or more controllers that manage the operation of devices. The controllers may be interacted with via user interface devices, such as dedicated touch-screen control units, that provide a user interface for controlling the devices. The user interface may include an array of touch-sensitive buttons, where each button controls a device or a group of devices.

However, such button-centric on-screen user interfaces share many of the same shortcomings as mechanical switches. While the buttons are shown on a screen, rather than existing as physical objects like mechanical switches, they operate very similarly. By looking at an on-screen button, it may not be apparent what the button does. While a label may be provided, often such labels are short and cryptic, given the constraints of screen space. A new guest to a room, similar to the case with mechanical switches, may have to touch each on-screen button to discover by trial and error what button achieves what result.

Recently, a virtual-room based device control solution has been developed that addresses many of the shortcomings of mechanical switches and button-centric on-screen user interfaces. This virtual-room based device control solution provides a virtual room-based user interface that includes one or more virtual rooms. By interacting with the virtual rooms, a user may indicate desired state changes for devices within the physical room.

However, while this type of solution solves many of the shortcomings of mechanical switches and button-centric on-screen user interfaces, it presents new challenges. One challenge is how to generate the virtual rooms in an economical manner. Unlike many other types of user interface screens, virtual rooms are unique. A single screen cannot be centrally designed and then merely distributed; each virtual room generally needs to be custom created for a corresponding physical room of a structure.

Further, virtual rooms may need to be re-created on an ongoing basis. Since a virtual room is intended to correspond to a physical room, if the appearance of the physical room changes, the corresponding virtual room may need to be re-created to provide a satisfactory user experience. For example, if a user rearranges furniture, repaints walls, or otherwise changes the appearance of the physical room, the corresponding virtual room may need to be re-created to reflect these changes. The expense incurred creating and recreating virtual rooms poses a barrier to their more widespread use in device control user interfaces.

Accordingly, there is a need for improved techniques to generate virtual rooms that may address some or all of these challenges.

SUMMARY

In one embodiment, a technique is provided to rapidly and economically generate a virtual room of a virtual room-based user interface that control devices coupled to a home automation or electronic device control system. The technique may be implemented on a mobile device, for example, a tablet computer, by a user who lacks specialized training, for example, a homeowner or other end-user.

For a given virtual room of the virtual room-based user interface, an application executing on the mobile device prompts a user to select one or more services provided by devices (e.g., light fixtures, motor-actuated devices, or electronic devices) within the physical room, to be controllable via the virtual room. The selected services may be a subset of all services that are possible by the devices within the physical room. Each service may have at least one active state and an inactive state, the natures of which generally depend on the particular service. The configuration application executing on the mobile device then obtains a plurality of images (e.g., photographs) of the physical room in different states, where each image shares substantially the same perspective (e.g., is captured from the same location in the same direction). The plurality of images may include an all-off image, in which all of the one or more of the services are in the inactive state, and one or more service-specific images, in which a single service is in the active state and other services are in the inactive state. In one alternative, the configuration application obtains the plurality of images by capturing each image using a camera of the mobile device, while the configuration application deactivates and then sequentially activates services within the room. In another alternative, the configuration application obtains the plurality of images by prompting the user to assign previously-captured images from an image library.

After the plurality of images of the physical room have been obtained, the configuration application executing on the mobile device aligns the images to create an aligned image stack. Such alignment compensates for minor differences in perspective between the plurality of images. The alignment may be a manual process, based on input received on the mobile device from the user. Alternatively, the alignment may be an automatic process, utilizing an image feature alignment algorithm, to create the aligned image stack. The configuration application executing on the mobile device then designates one or more hit boxes about devices shown in the images of the aligned image stack. Each hit box corresponds to a service provided by the respective device. The designation of hit boxes may be based upon input on the mobile device from the user.

Based upon the aligned image stack and the designated one or more hit boxes, the configuration application generates a virtual room of the virtual room-based user interface, that is usable to control the one or more devices within the physical room and thereby the one or more services they provide. The generated virtual room may be displayed to the user on the mobile device, and the user prompted to test its functionality. Should the functionality differ from the user's expectations, the user may cause the configuration application to repeat one or more of the sequence of steps to change the virtual room. Otherwise, the virtual room may be finalized and used along with other virtual rooms (created in a similar manner) in the virtual room-based user interface.

It should be understood that a variety of additional features and alternative embodiments may be implemented. This Summary is intended simply as an introduction to the reader, and does not indicate or imply that the examples mentioned herein cover all aspects of the invention, or are necessary or essential aspects of the invention.

BRIEF DESCRIPTION OF THE DRAWINGS

The description below refers to the accompanying drawings, of which.

DETAILED DESCRIPTION

Figure 1:
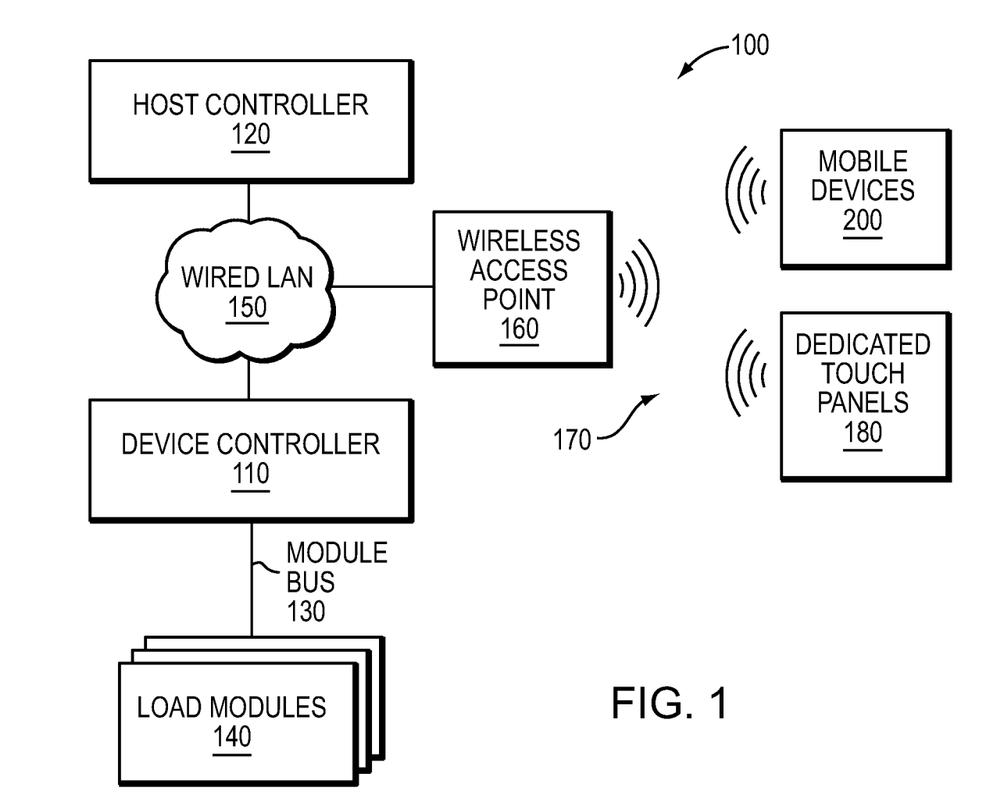
FIG. 1 is a block diagram of a generalized architecture for a home automation or electronic device control system configured to control devices within a physical room of a structure.

FIG. 1 is a block diagram of a generalized architecture for a home automation or electronic device control system 100 configured to control devices within a physical room of a structure. The devices may include light fixtures, motor-actuated devices, electronic devices, and/or other types of devices. The light fixtures may be lamps, overhead fixtures, task lights or other types of lighting devices. The motor-actuated devices may be automatic window shades, automatic doors, motorized television lifts, or other type of devices moved by motors. The electronic devices may be display screens (e.g., televisions and monitors), audio/video (a/v) devices, computer devices, or other types of devices utilizing electronics.

The example system 100 may be composed of a number of components, including controllers, user interface devices, and control modules. The controllers may include a device controller 110 and a host controller 120. The user interfaces devices may include dedicated touch panel units 180 and mobile devices 200. The control modules may include load modules 140. Each of these components may interoperate to control devices within the structure.

More specifically, the device controller 110 may provide control and communication functionality, and supports, via a module bus 130, the load modules 140. The device controller 110 may be responsible for issuing control commands to individual load modules 140 to cause them to change the state of specific devices coupled to them. The host controller 120 may be coupled to the device controller 110, for example, by a wired local area network (LAN) 150. The host controller 120 may be configured to control and monitor operations of the device controller 110, as well as to provide high-level control and user interface support functions. These user interface support functions may support, among other things, a virtual room-based user interface for controlling the devices.

One or more wireless access points 160 may be coupled to the LAN 150, and support, for example, a wireless local area network (WLAN) 170 used to communicate with dedicated touch panels 180 and mobile devices 200. Alternatively, or additionally, dedicated touch panels 180 and mobile devices 200 may communicate with the host controller 120 via wired connections to the wired LAN 150. As discussed in more detail below, the dedicated touch panels 180 and mobile devices 200 may present a virtual room-based user interface, via which a user may indicate desired changes to the state of devices within the structure.

As used herein, the term "mobile device" refers to a multi-purpose electronic device that is adapted to be transported on one's person and includes a wireless communication interface and a touch sensitive display screen. A mobile device may, but need not, include an integrated camera. Devices such as tablet computers (e.g., the iPad® tablet available from Apple, Inc.) and smartphones (e.g., the iPhone® smartphones available from Apple, Inc., and Android® smartphones available from various suppliers), are considered mobile devices. Devices such as desktop computers are generally not considered mobile devices. The mobile devices 200 of the system 100 may be used in a control role, to provide the virtual room-based user interface to a user, or in a configuration role, to support generation of the virtual room-based user interface. An individual mobile device may be used in only one, or in both, of these roles.

Figure 2:
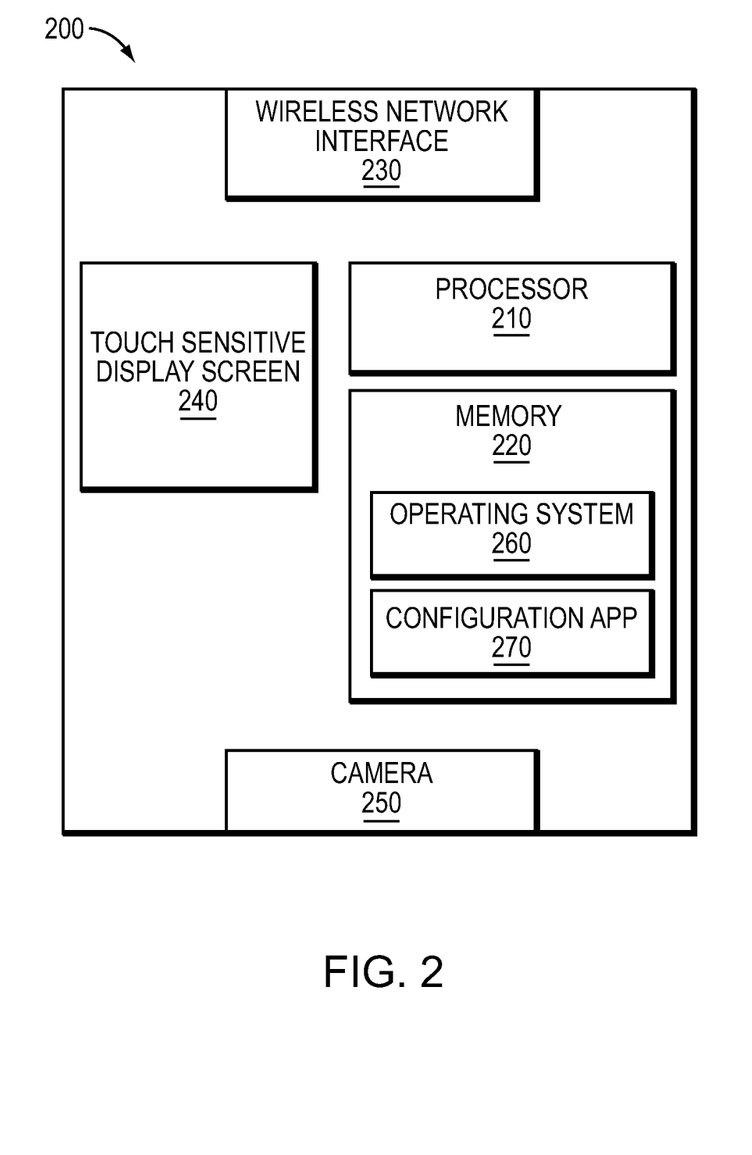
FIG. 2 is a block diagram of an example mobile device.

FIG. 2 is a block diagram of an example mobile device 200. The mobile device 200 may include a processor 210, a memory 220, a wireless network interface 230, a touch-sensitive display screen 240, a camera 250, as well as other hardware. The processor 210 may include logic configured to execute software and manipulate data structures. The memory 220 may include a plurality of storage locations for storing the software and the data structures. The wireless network interface 230 may facilitates communication over a WLAN and/or cellular broadband data network. The touch-sensitive display screen 240 may receive user input in the form of gestures (e.g., touches, swipes, etc.) from a user.

An operating system 260 resident in memory 220, may functionally organize the mobile device 200. The operating system 260 may be an IOS® operating system available from Apple, Inc., an Android® operating system available from Google, Inc., or another type of operating system. A configuration application 270 may be executed in conjunction with the operating system 260, to permit the mobile device 200 to operate in a configuration role, to generate a virtual room of a virtual room-based user interface. The configuration application 270 may display a configuration user interface on the touch sensitive display screen 240, and receive user input thereon. In addition, a control application (not shown) may also be stored in the memory 220, and executed to permit the mobile device 200 to operate in a control role. The control application (not shown) may display the virtual room-based user interface on the touch sensitive display screen 240, and receive user input thereon, to permit a user to indicated desired changes to the state of devices within the structure.

The virtual room-based user interface may include one or more virtual rooms that each show a photo-realistic depiction of a corresponding physical room of the structure. The photo-realistic depiction may show boundaries of the physical room (e.g., the walls, ceiling, floor, etc.), furnishings present in the physical room (e.g., sofas, chairs, beds, wall-hangings, etc.), and controllable devices present in the physical room (e.g., light fixtures, motor-actuated devices, electronic devices, and/or other types of devices). The photo-realistic depictions of the devices are preferably shown at locations within the virtual room corresponding to the device's actual locations within the physical room. The virtual room may operate as an interface environment. By interacting with (e.g., touching) photo-realistic depictions of the devices within the virtual room, a user may indicate changes to the state of services provided by the corresponding devices in the physical room. As the state of devices is changed so they provide different services within the physical room, the appearance of the virtual room may be dynamically updated to reflect the changes. In such manner, the virtual room may be updated to reflect back to the user a photo-realistic depiction of the present condition of the corresponding physical room, such that what a user views within the virtual room will mirror, or at least resemble, their experience within the corresponding physical room. Such an interface may be highly intuitive, allowing a user to readily indicate control selections without having to understand complicated control schemes.

Figure 3:
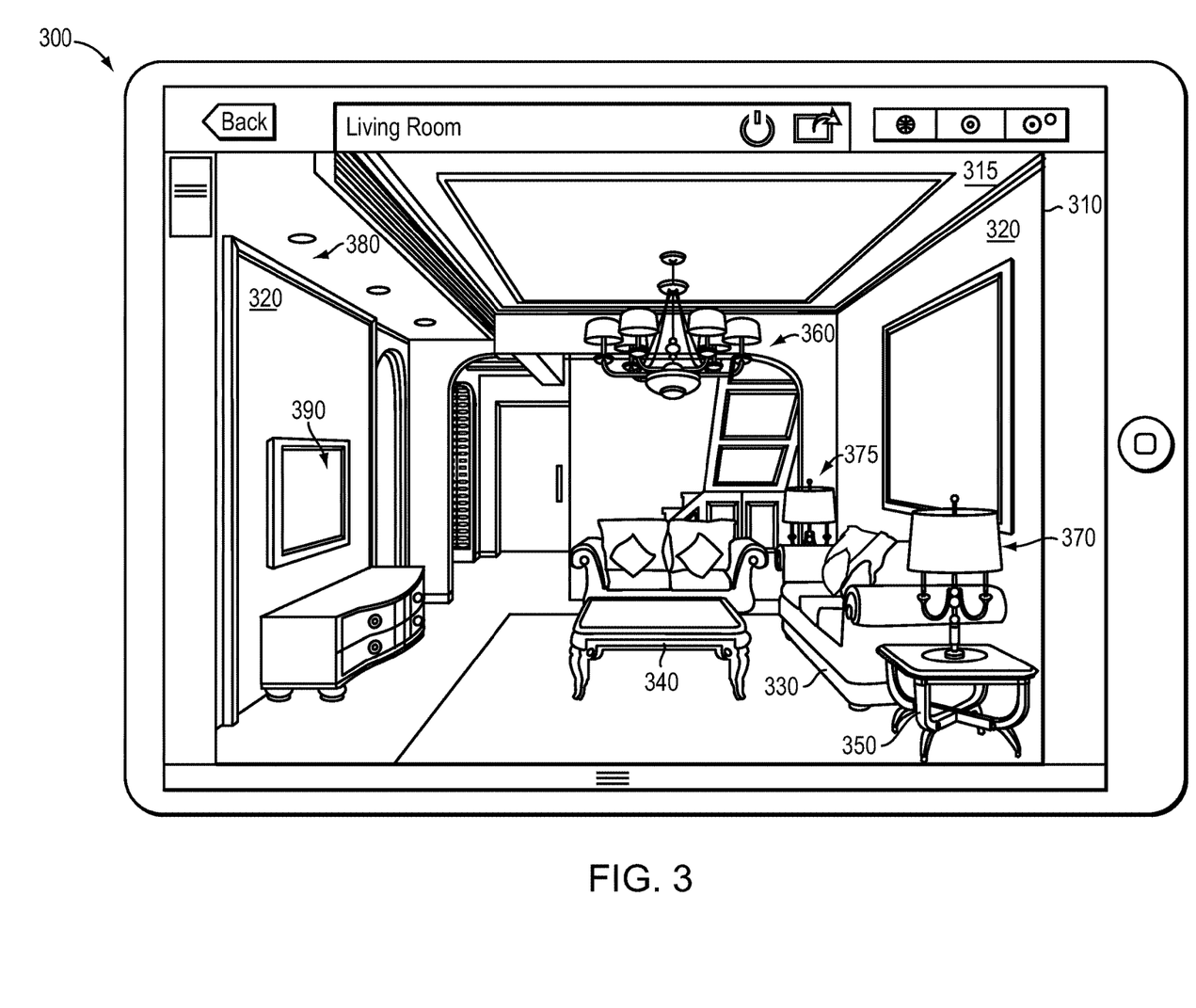
FIG. 3 is a front view of an example mobile device showing an example virtual room of an example virtual room-based user interface displayed upon a touch-sensitive screen.

FIG. 3 is a front view 300 of an example mobile device showing an example virtual room 310 of an example virtual room-based user interface displayed upon a touch-sensitive screen of the mobile device. The example virtual room 310 corresponds to a living room within an example home. However, it should be understood that such choice of room for this example is arbitrary. The example virtual room 310 includes photo-realistic depictions of boundaries of the physical room, such as the ceiling 315 and walls 320; photo-realistic depictions of furnishings present in the physical room, such as a sofa 330, coffee table 340, and end table 350; as well as photo-realistic depictions of controllable devices within the physical room, such as a chandelier 360, lamps 370, 375, recessed cans 380, and a television 390. Each of these devices 360-390 provides a service having states, which include at least one active state and an inactive state. For example, the chandelier 360, lamps 370, 375, and recessed cans 380 provide a lighting service that includes an active state of "on" (and potentially a plurality of active sub-states representing different lighting levels), and an inactive state of "off". Similarly, the television 390 provides a viewing service that includes an active state of "on" (and potentially a plurality of active sub-states representing different video sources, channels, volume levels, etc. being displayed/used), and an inactive state of the television being "off".

By interacting with (e.g., touching) photo-realistic depictions of the devices 360-390 within the virtual room 310, a user may indicate changes to the state of the services provided by the corresponding devices in the corresponding physical room. These changes may be implemented by the home automation or electronic device control system 100. For example, by touching the photo-realistic depiction of the chandelier 360, the user may cause the chandelier within the physical room to be illuminated (or otherwise controlled). Similarly, by touching the photo-realistic depiction of the television 390, the user may cause the television within the physical room to be powered on (or otherwise controlled). For more advanced control, one or more menus (not shown) may be presented within the virtual-room based user interface, for example, overlaid upon a portion of the virtual room 310, to permit further control selections.

As the devices 360-390 provide different services, the appearance of the virtual room 310 may be dynamically updated to reflect the changes. For example, when the chandelier is turned on, the photo-realistic depiction of the chandelier 360 within the virtual room 310 is changed to depict the chandelier in an illuminated state. Similarly, if the television is powered on, the photo-realistic depiction of the television 390 within the virtual room 310 is changed to depict the television in a powered on state. In this manner, the virtual room 310 may minor, or at least resemble, the present appearance of the physical room.

As discussed above, it has previously been a challenge to generate virtual rooms in an economical manner. To address this challenge, the configuration application 270 may implement a sequence of steps that enable a user who lacks specialized training, for example, a homeowner or other end-user, to generate virtual rooms and thereby construct a virtual room-based user interface. This may obviate the need for custom programming and configuration by an installer. The sequence of steps may be repeated for each desired virtual room.

Figure 4:
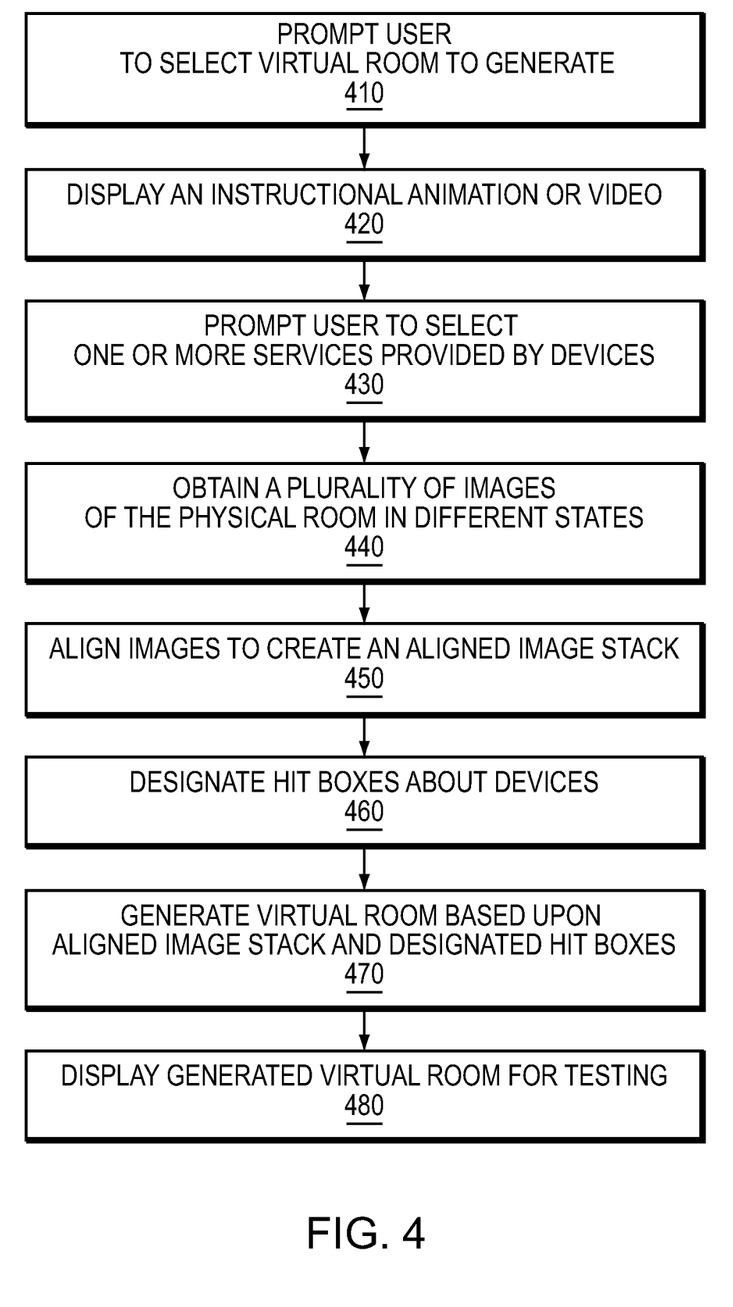
FIG. 4 is a flow diagram of an example sequence of steps for generating a given virtual room of a virtual room-based user interface.

FIG. 4 is a flow diagram of an example sequence of steps 400 for generating a virtual room of a virtual room-based user interface. At step 410, the configuration application 270 may prompt a user to select a virtual room to generate. At step 420, the configuration application 270 may display an instructional animation or video providing guidance on how to prepare the physical room, what to do if certain issues are encountered, and other topics. For example, the instructional video may discuss the use of ambient lighting, how to maintain consistency among images, how to estimate the number of images needed, what to do if all the services cannot fit into one image, etc.

At step 430, the configuration application 270 prompts the user to select one or more services provided by devices (e.g., light fixtures, motor-actuated devices, or electronic devices) to be controllable via the virtual room. The selected services may be a subset of all services that are possible by the devices within the physical room. Further, text descriptions, animations and/or video may guide the user through the selection process.

Figure 5:
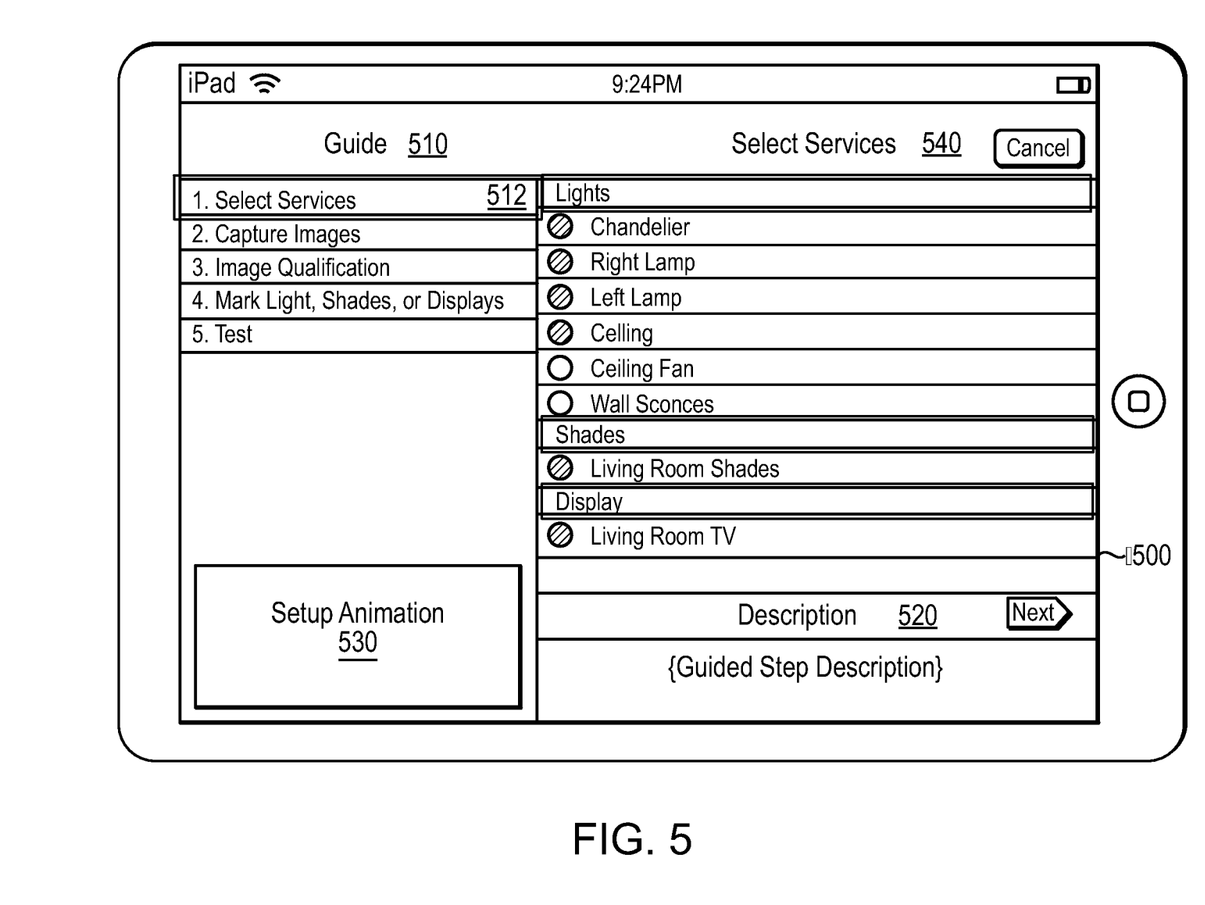
FIG. 5 is a front view of an example mobile device showing an example service selection screen.

FIG. 5 is a front view of an example mobile device showing an example service selection screen 500 provided by the configuration application 270. A guide portion 510 of the screen may indicate the steps used in generating a virtual room, with a present step being to select services 512. A description portion 520, and an animation/video portion 530, may provide text and pictorial guidance to the user. Finally, a selection portion 540 may provide a listing of services, from which a user can select desired services (e.g., by touch) to be controllable. Each service may correspond to a respective device and share a name with the device.

At step 440, the configuration application 270 obtains a plurality of images (e.g., photographs) of the physical room in different states, where each image shares substantially the same perspective (e.g., is captured from the same location in the same direction). The plurality of images may include an all-off image, in which all of the services are in the inactive state, and one or more service-specific images, in which a single service is in the active state and other services are in the inactive state.

In one alternative, the configuration application 270 may obtain the plurality of images by capturing each image using the camera 250 of the mobile device 200, while the configuration application 270 deactivates, and then sequentially activates, services within the room. In another alternative, the configuration application 270 may obtain the plurality of images by prompting the user to assign previously-captured images from an image library.

Figure 6:
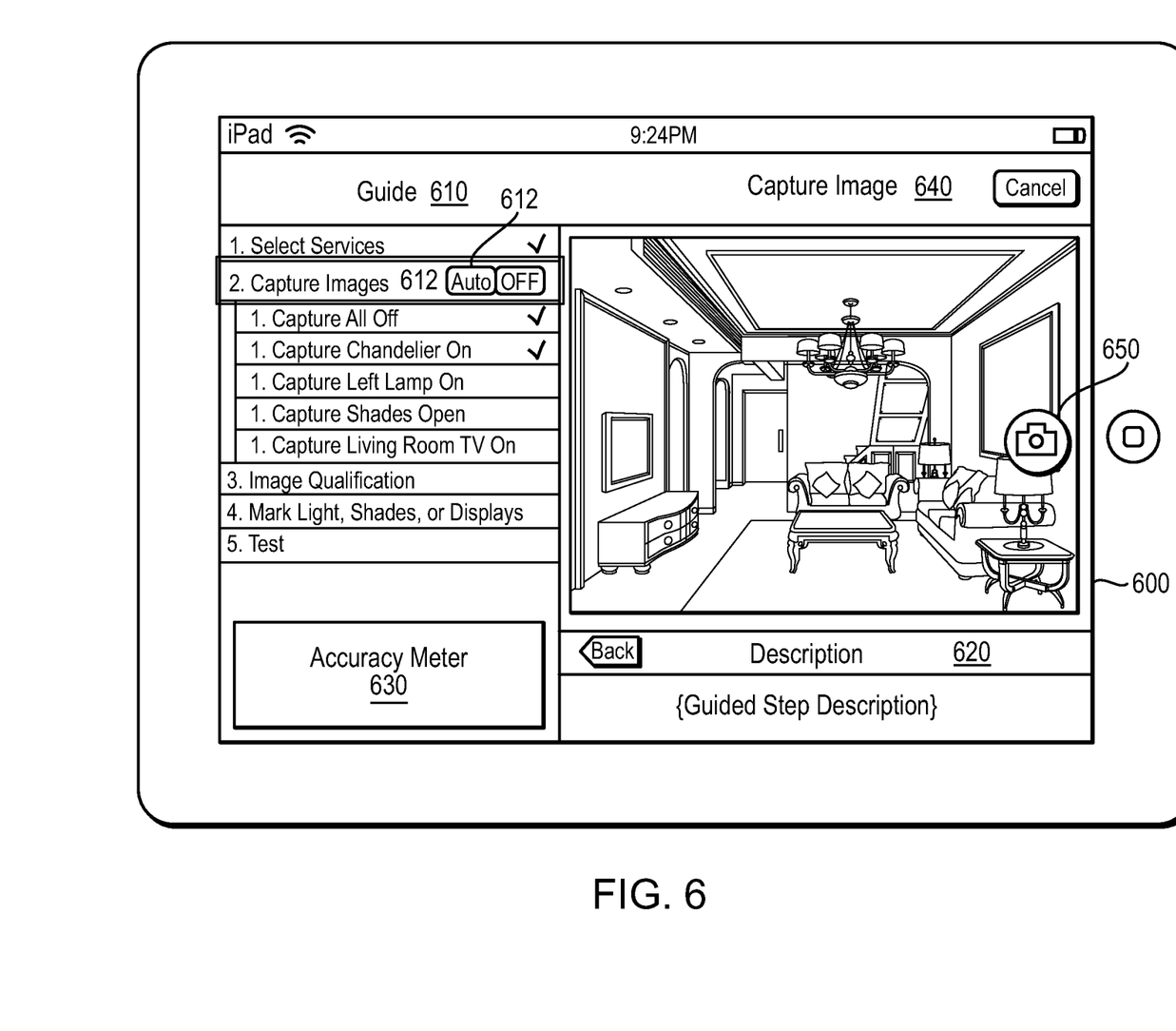
FIG. 6 is a front view of an example mobile device showing an example image capture screen, according to one alternative.

FIG. 6 is a front view of an example mobile device showing an example image capture screen 600 provided by the configuration application 270, according to one alternative. A guide portion 610 of the screen may be expanded to show image capture steps. A user may select from the guide portion 610 using options 612. The options may include an automated mode, where the configuration application 270 controls camera operation, and a manual mode, where the user controls the camera operations. A description portion 620 may instruct the user to stand in one location and point the camera 250 in one direction. The user may position the camera 250 by looking at an image capture portion 640 of the screen 600. If the automated mode is selected, the configuration application 270 may rapidly cycle through service activations, while activating the camera 250 when appropriate. For example, the configuration application 270 may communicate with the host controller 120 and device controller 110 to cause all services to be in the inactive state, and then trigger the camera 250 to capture an all-off image. The configuration application 270 may sequentially cause the single services to be activated, and trigger the camera 250 to capture a service-specific image each time.

If the manual mode is selected, the configuration application 270 may control service activation, but the user may control camera functions. For example, the configuration application 270 may communicate with the host controller 120 and device controller 110 to cause all services to be in the inactive state, and then prompt the user to use the camera 250 to take an all-off image. The user may capture the image by interacting with a camera button 650. The configuration application 270 may sequentially activate single services, and prompt the user each time to use the camera button 650 to take a service-specific image. After capturing each image, a user may have the option to retake the image before proceeding onward. The user may base the decision of whether or not to retake the image multiple factors. One factor may be the similarity of perspective to previously captured images, such as the all-off image. An accuracy meter 630 may be provided to indicate such similarity to the user. In this manner, images may be obtained by image capture.

Figure 7:
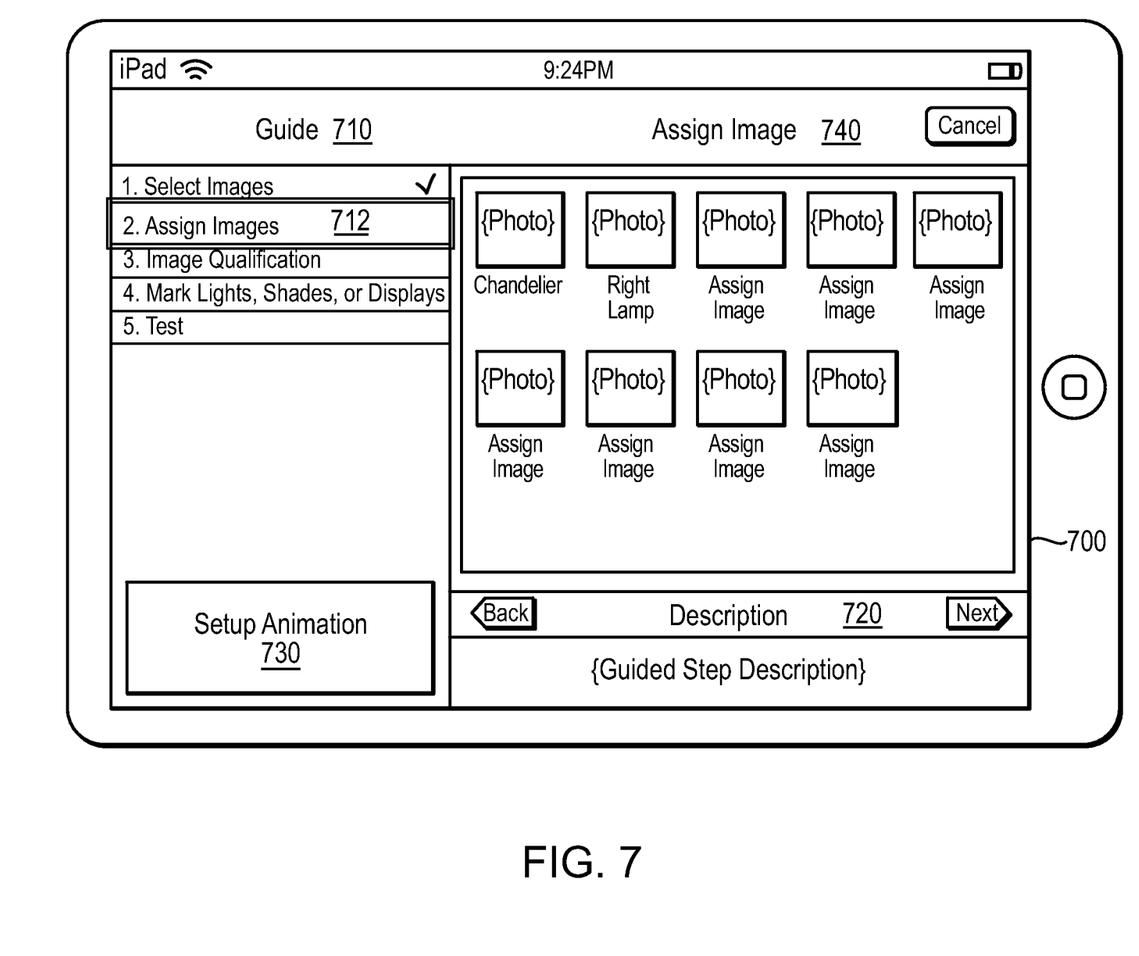
FIG. 7 is a front view of an example mobile device showing an example image assignment screen, according to another alternative.

As mentioned above, the image may also be obtained from pre-captured images. FIG. 7 is a front view of an example mobile device showing an example image assignment screen 700. A guide portion 710 of the screen may show that the present step it to assign images 712. A description portion 720 and a video/animation portion 730 may provide instructions regarding image assignment. An assignment portion 740 may display previously-captured images. The user may be prompted to select each image, and to assign each image to a respective role, for example, either as the all-off image or as a certain one of the service-specific images. When so assigned, a name of the role may be displayed below each image. In some cases the name may coincide with the name of the device.

At step 450, the configuration application 270 aligns the images to create an aligned image stack. Such alignment compensates for minor differences in perspective between the plurality of images. The alignment may be a manual process, based on input received on the mobile device 200 from the user. Alternatively, the alignment may be an automatic process, utilizing an image feature alignment algorithm executing on the mobile device 200, to create the aligned image stack.

Figure 8:
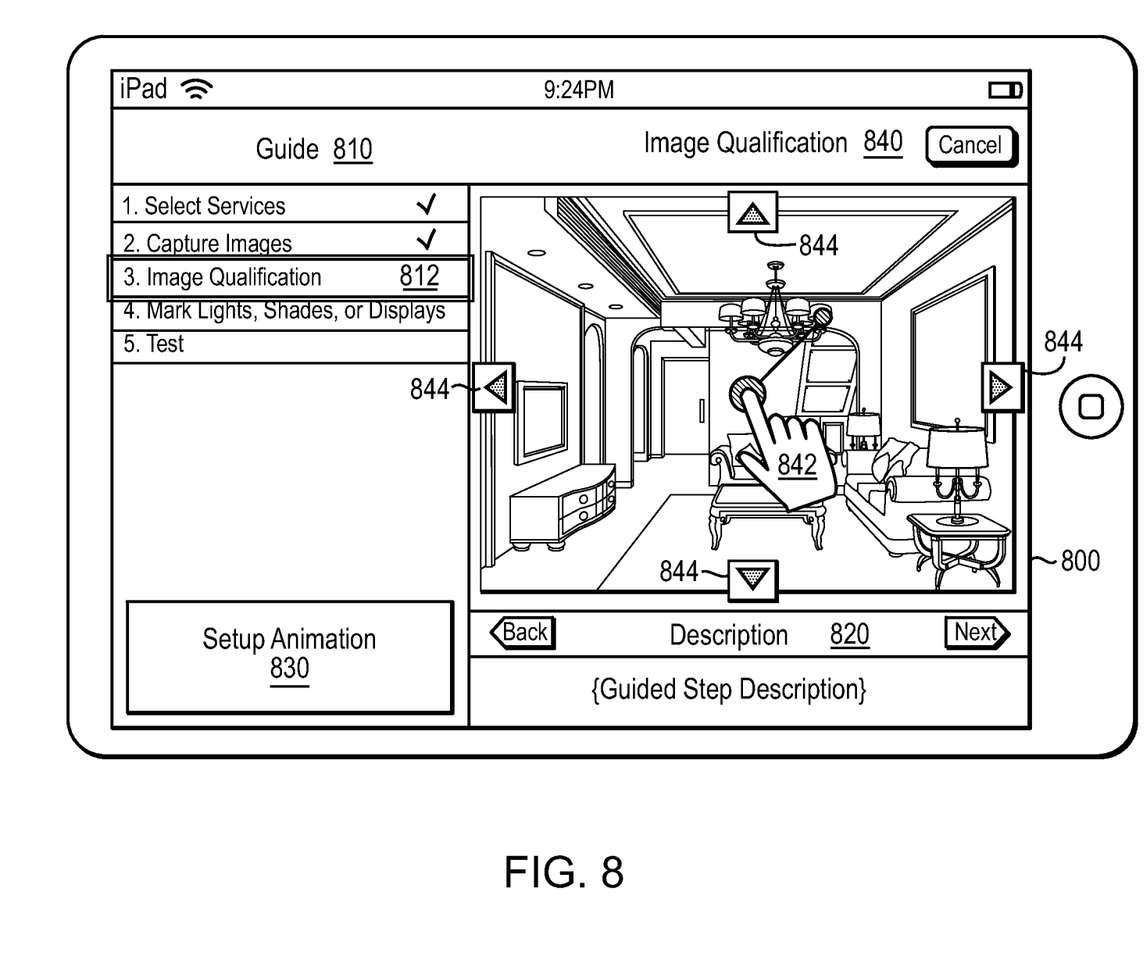
FIG. 8 is a front view of an example mobile device showing an example image qualification screen, where images are manually aligned.

FIG. 8 is a front view of an example mobile device showing an example image qualification screen 800, where images are manually aligned. A guide portion 810 of the screen 800 may show that the present step is to qualify/align images 812. A description portion 820 and a video/animation portion 830 may provide instructions regarding image alignment. An alignment portion 840 of the screen may allow a user to manually move images to align them. For example, the all-off image may be displayed, and sequentially each service-specific image may be overlaid upon it. The user may be prompted to adjust the alignment of the service-specific image, for example, by dragging 842 or using directional buttons 844, so that features coincide with the all-off image, to create the aligned image stack.

At step 460, the configuration application 270 designates one or more hit boxes about devices shown in the images of the aligned image stack. Hit boxes may be regions that when selected (e.g., touched) cause a state of a service to be changed. While hit boxes may be delineated by visible boundaries as they are designated, when incorporated into a final virtual room, they are generally invisible to the user.

Figure 9:
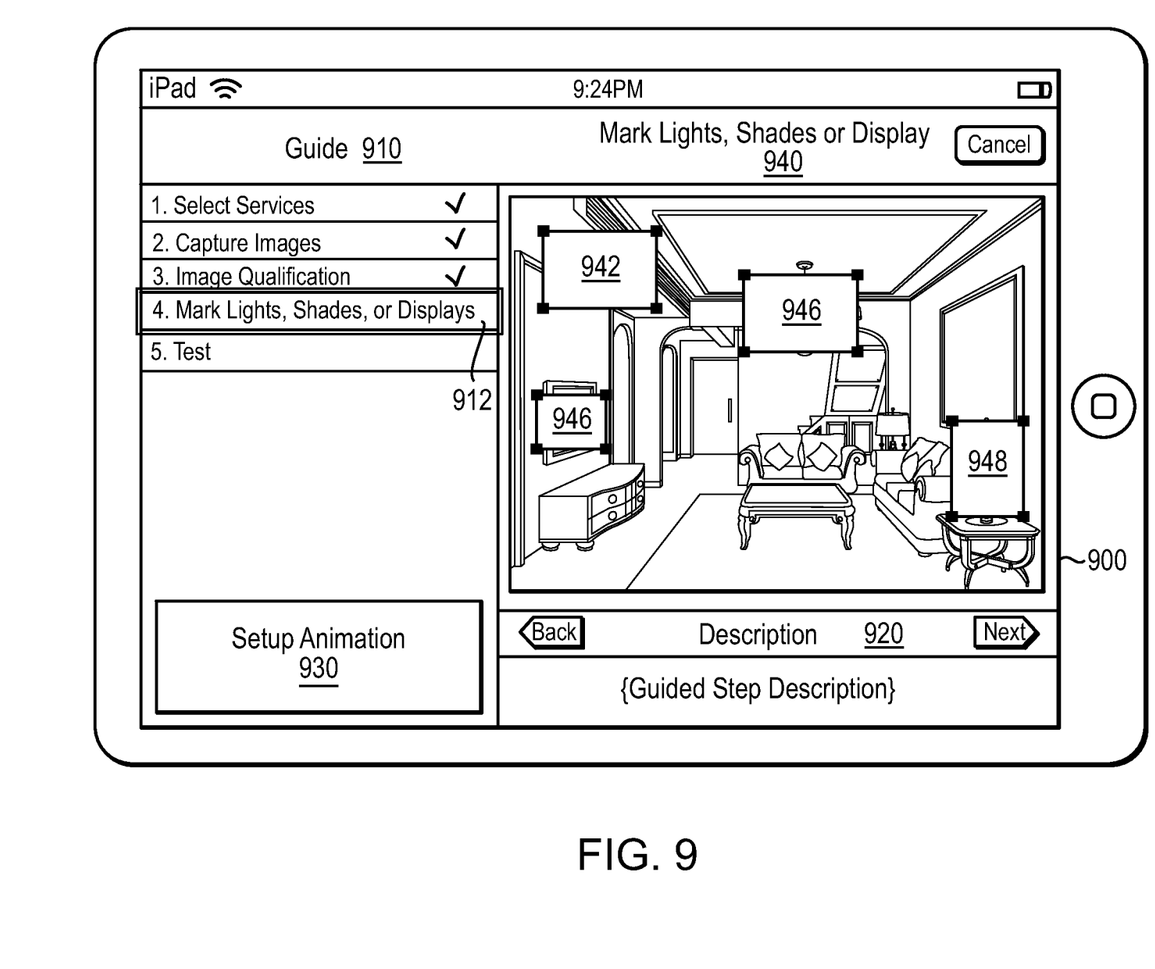
FIG. 9 is a front view of an example mobile device showing an example marking screen, where hit boxes are defined.

FIG. 9 is a front view of an example mobile device showing an example marking screen 900, where hit boxes are defined. A guide portion 910 of the screen may show that the present step it to mark hit boxes 912. A description portion 920 and a video/animation portion 930 may provide instructions regarding hit box creation. A hit box creation portion 940 may allow a user to draw, size, and position shapes representing the hit box 942-948 over respective devices. For example, a user may touch the screen and drag diagonally to create a hit box. The user may then assign that hit box to a particular service provided by a device. A user may also resize and adjust the hit box. In one implementation, hit boxes are not allowed to overlap each other.

At step 470, based upon the aligned image stack and the designated one or more hit boxes, the configuration application 270 generates a virtual room of the virtual room-based user interface. The configuration application 270 may employ a number of filtering routines, image adjustment routings, and other software processes as part of step 470. Further details of example operations that may be utilized are provided in U.S. patent application Ser. No. 12/792,236, which was incorporated by reference above.

At step 480, the configuration application 270 displays the generated virtual room for testing. Should the functionality differ from user-expectations, the user may cause the configuration application 270 to repeat one or more of the sequence of steps, to change the virtual room. Otherwise, the virtual room may be finalized.

Figure 10:
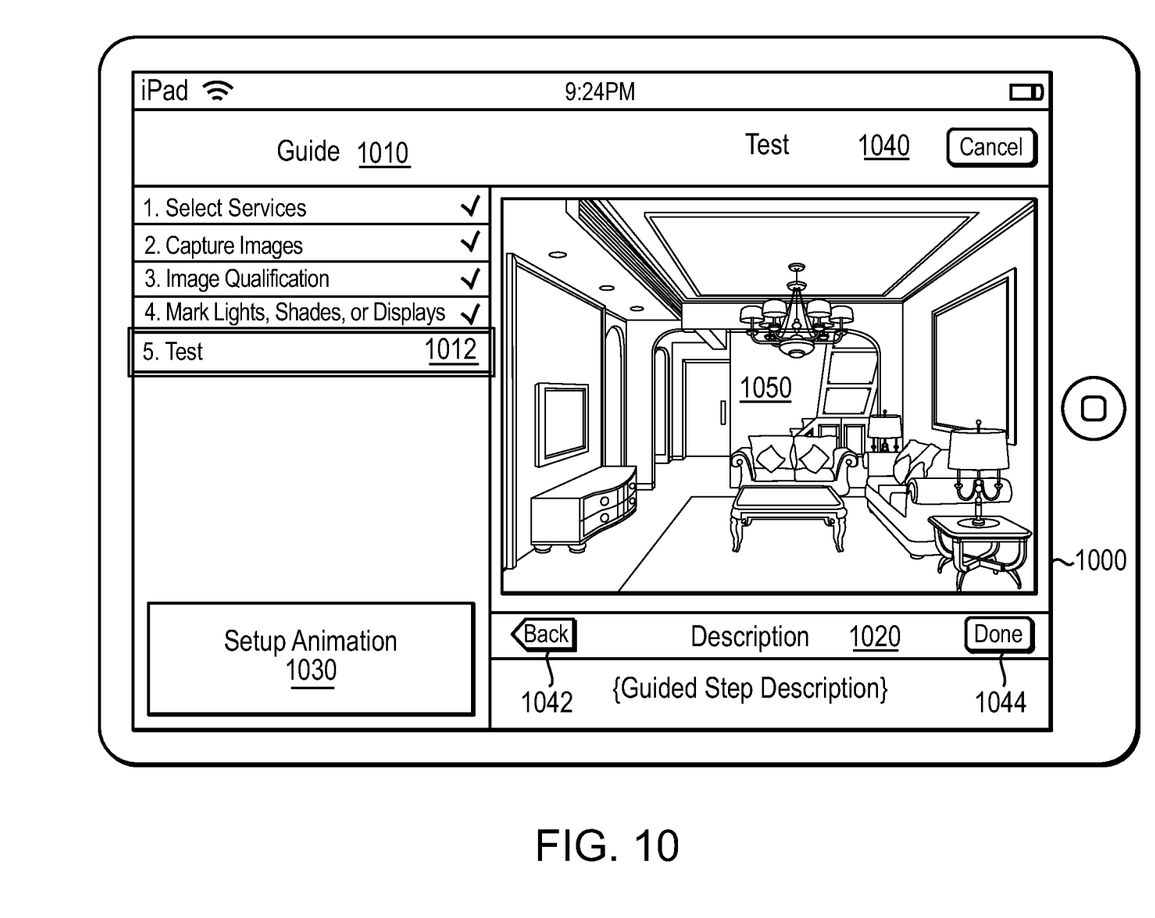
FIG. 10 is a front view of an example mobile device showing an example marking screen, where a virtual room is tested.

FIG. 10 is a front view of an example mobile device showing an example testing screen 1000, where a virtual room is tested. A guide portion 1010 of the screen may show that the present step 1012 it to test the virtual room. The virtual room 1050 may be shown in a test portion 1040. A description portion 1020 and a video/animation portion 1030 may provide instructions regarding the testing. For example, the user may be instructed to interact with the virtual room 1050, and touch the photo-realistic depiction for each of the devices (where the now-invisible hit boxes are located). The user may then observe whether the services provided in the physical room meet their expectations. If not, the user may cause the configuration application 270 to repeat an earlier step by selecting a back control 1042. If so, the user may finalize the virtual room by selecting a confirmation control 1044.

In summary, a technique is described herein that allows rapid and economical generation of virtual rooms for a virtual room-based user interface that controls devices coupled to a home automation or electronic device control system. While the above description provides certain specific examples, it should be apparent that a number of modifications and/or additions may be made thereto.

For instance, while it is discussed above that steps may be performed on a mobile device 200, it should be understood that at least some of the steps may be performed on other types of electronic devices, which lack the characteristics of a mobile device. For example, at least some of the steps may be performed on a desktop computer. Further, steps may be performed on several devices working in conjunctions. For example, some steps may be performed on a desktop computer, while other steps, for example those related to image capture, may be performed by a stand-alone digital camera. A wide variety of alternative arrangements are possible.

Further, while it is discussed above that a substantially photo-realistic depiction may be captured by a camera, a substantially photo-realistic depiction may be otherwise created. For example, a photo-realistic depiction may be rendered from a model by a computer-aided-design (CAD) application.

Still further, while reference is made above to a "physical room", it should be understood that a physical room need not coincide with a "room" as labeled on a floor plan or blueprint of the structure. A physical room may be a portion of a room as labeled on a floor plan or blueprint, a combination of multiple such rooms, or other logical partition of a structure defined by one or more boundaries.

Additionally, it should be understood that the steps described above may be implemented in hardware, software (embodied as a non-transitory computer-readable medium containing program instructions), firmware, or a combination thereof. A non-transitory computer-readable medium may take the form of a memory, such as a Random Access Memory (RAM), a disk, such as a CD-ROM, or other tangible storage medium.

In general, it should be understood that the above descriptions are meant to be taken only by way of example.

What is claimed is:

1. A method for generating a virtual-room of a virtual room-based user interface that controls one or more devices within a physical room of a structure, comprising:
   prompting a user of a mobile device to select one or more services provided by the one or more devices within the physical room, each device providing a corresponding service;
   obtaining, on the mobile device, a plurality of images of the physical room captured by a camera that is located at substantially a same location and is pointed in substantially a same direction when capturing each image, the plurality of images including an all-off image of the physical room, in which all of the one or more of the services are in an inactive state, and one or more service-specific images of the physical room, in which a single service is in an active state and any other services are in the inactive state;
   aligning the plurality of images to create an aligned image stack in which features in each of the plurality of images coincide;
   designating, on the mobile device, one or more hit boxes, each hit box to coincide with one of the one or more devices; and
   generating the virtual room based on the aligned image stack and the designated one or more hit boxes, the generating to filter and adjust the images of the aligned image stack to render the virtual room with services in different states, the virtual room usable by a user to control the one or more devices within the physical room and having a visual appearance that is dynamically updated to reflect the changes caused by the one or more devices within the physical room.

2. The method of claim 1, wherein the virtual room provides a photo-realistic depiction of the physical room, wherein the photo-realistic depiction of the physical room includes photo-realistic depictions of the one or more devices.

3. The method of claim 2, wherein the photo-realistic depictions of the one or more devices each depict a current state of a respective device.

4. The method of claim 1, wherein the camera is a camera of the mobile device, and the obtaining further comprises:
   capturing each of the plurality of images using the camera of the mobile device.

5. The method of claim 4, wherein the capturing is performed while services in the physical room are deactivated and then sequentially activated one at a time.

6. The method of claim 1, wherein the obtaining further comprises:

assigning previously-captured images from an image library.

7. The method of claim 1, wherein the aligning further comprises:
displaying a first image of the plurality of images overlaid upon at least a second image of the plurality of images; and
adjusting the first image and the second image in response to user input so that features of the first image and the second image coincide.

8. The method of claim 1, wherein the designating is based upon input in relation to the aligned image stack.

9. The method of claim 1, further comprising:
testing the generated virtual room; and
in response to the testing, either finalizing the generated virtual room or repeating one or more of the steps of selecting, obtaining, aligning, designating or generating to refine the virtual room.

10. The method of claim 1, wherein the generating is performed by the mobile device.

11. A mobile device for generating a virtual-room of a virtual room-based user interface that controls one or more devices within a physical room of a structure, comprising:
a touch sensitive display screen;
a camera;
a memory configured to store a configuration application;
a processor configured to execute the configuration application, the configuration application, when executed, operable to:
prompt a user of the mobile device to select one or more services provided by the one or more devices within the physical room,
capture a plurality of images of the physical room with the camera of the mobile device while located at substantially a same location and pointed in substantially a same direction,
align the plurality of images to create an aligned image stack in which features in each of the plurality of images coincide,
designate, in response to input on the touch sensitive display screen of the mobile device, one or more hit boxes, each hit box to coincide with one of the one or more devices, and
generate the virtual room based on the aligned image stack and the designated one or more hit boxes in part by filtering and adjusting the images of the aligned image stack to render the virtual room with services in different states, the virtual room usable by a user to control the one or more devices within the physical room and having a visual appearance that is dynamically updated to reflect the changes caused by the one or more devices within the physical room.

12. The mobile device of claim 11, wherein the virtual room provides a photo-realistic depiction of the physical room, wherein the photo-realistic depiction of the physical room includes photo-realistic depictions of the one or more devices.

13. The mobile device of claim 12, wherein the photo-realistic depictions of the one or more devices each depict a current state of a respective device.

14. The mobile device of claim 11, wherein the configuration application, when executed, is further operable to cause a home automation or device control system to deactivate and then sequentially activate services one at a time, the plurality of images captured while the configuration application is causing the home automation or device control system to deactivate and then sequentially activate services.

15. The mobile device of claim 11, wherein the plurality of images includes an all-off image, in which all of one or more services provided in the physical room are in an inactive state, and one or more service-specific images, in which a single service of the one or more services is in an active state and any other services are in the inactive state.

16. The mobile device of claim 11, wherein the configuration application, when executed, is further operable to display a first image of the plurality of images overlaid upon at least a second image of the plurality of images on the touch sensitive display screen, and, in response to touch input from the user on the touch sensitive display screen, adjust the first image and the second image so that features of the first image and the second image coincide.

17. The mobile device of claim 11, wherein the configuration application, when executed, is further operable to designate the hit boxes based upon touch input from the user on the touch sensitive display screen.

18. The mobile device of claim 11, wherein the configuration application, when executed, is further operable to test the generated virtual room, and either finalize the generated virtual room or repeat operations to refine the generated virtual room.

19. A non-transitory computer-readable medium having software encoded thereon, the software, when executed on one or more processors, operable to:
prompt a user in a configuration user interface to select one or more services provided by one or more devices within a physical room of a structure;
obtain a plurality of images of the physical room captured by a camera that is located at substantially a same location and is pointed in substantially a same direction when capturing each image, the plurality of images including an all-off image of the physical room, in which all of one or more services provided in the room are in an inactive state, and one or more service-specific images of the physical room, in which a single service of the one or more services is in an active state and any other services are in the inactive state;
align the plurality of images to create an aligned image stack in which features in each of the plurality of images coincide;
designate, in the configuration user interface, one or more hit boxes, each hit box to coincide with one of the one or more devices; and
generate a virtual room of a virtual room-based user interface using the aligned image stack and the designated one or more hit boxes in part by filtering and adjusting the images of the aligned image stack to render the virtual room with services in different states, the virtual room usable by a user to control the one or more devices within the physical room and having a visual appearance that is dynamically updated to reflect the changes caused by the one or more devices within the physical room.

20. The non-transitory computer-readable medium of claim 19, wherein the virtual room provides a photo-realistic depiction of the physical room, wherein the photo-realistic depiction of the physical room includes photo-realistic depictions of the one or more devices.

21. A method for generating a virtual-room of a virtual room-based user interface that controls one or more devices within a physical room of a structure, comprising:

prompting a user of a mobile device to select one or more services provided by the one or more devices within the physical room, each device providing a corresponding service;

obtaining, on the mobile device, a plurality of images of the physical room;

aligning the plurality of images to create an aligned image stack in which features in each of the plurality of images coincide;

generating the virtual room based on the aligned image stack, the generating to filter and adjust the images of the aligned image stack to render the virtual room with services in different states, the virtual room usable by a user to control the one or more devices within the physical room and having a visual appearance that is dynamically updated to reflect the changes caused by the one or more devices within the physical room.

22. The method of claim 21, wherein the virtual room provides a photo-realistic depiction of the physical room, wherein the photo-realistic depiction of the physical room includes photo-realistic depictions of the one or more devices.

23. The method of claim 21, wherein the camera is a camera of the mobile device, and the obtaining further comprises:

capturing each of the plurality of images using the camera of the mobile device, wherein the capturing is performed while services in the physical room are deactivated and then sequentially activated one at a time.

24. The method of claim 21, wherein the generating is performed by the mobile device.

\* \* \* \* \*

UNITED STATES PATENT AND TRADEMARK OFFICE
CERTIFICATE OF CORRECTION

| | |
|---|---|
| PATENT NO. | : 10,775,960 B2 |
| APPLICATION NO. | : 14/190984 |
| DATED | : September 15, 2020 |
| INVENTOR(S) | : Robert P. Madonna et al. |

It is certified that error appears in the above-identified patent and that said Letters Patent is hereby corrected as shown below:

In the Specification

Column 2, Line 36:
Should read:
re-creating virtual rooms poses a barrier to their more wide- Column 6, Line 54:
Should read:
the virtual room 310 may mirror, or at least resemble, the Signed and Sealed this
Third Day of May, 2022

Katherine Kelly Vidal
*Director of the United States Patent and Trademark Office*